United States Patent [19]

Sarett

[11] 4,338,746

[45] Jul. 13, 1982

[54] ENHANCEMENT OF FLOWERING BY FLOWERING TREES

[76] Inventor: Lewis H. Sarett, Rolling Hill Rd., Skillman, N.J. 08558

[21] Appl. No.: 234,743

[22] Filed: Feb. 17, 1981

[51] Int. Cl.³ .............................................. A01G 1/00
[52] U.S. Cl. ......................................... 47/58; 47/57.5
[58] Field of Search ........................... 47/58, 57.5, 1.3

[56] References Cited

U.S. PATENT DOCUMENTS

| | | | |
|---|---|---|---|
| 831,678 | 9/1906 | Osborne | 47/1.3 |
| 3,074,207 | 1/1963 | Laing | 47/57.5 |
| 3,120,722 | 2/1964 | Keller | 47/1.3 |

FOREIGN PATENT DOCUMENTS

| | | | |
|---|---|---|---|
| 345584 | 1/1937 | Italy | 47/57.5 |
| 422275 | 6/1947 | Italy | 47/1.3 |
| 462381 | 3/1951 | Italy | 47/57.5 |

OTHER PUBLICATIONS

Micronutrients in Crop Vigor, Stout, Agricultural & Food Chem., vol. 4, No. 12, Dec. 1956, pp. 1000–1006.

*Primary Examiner*—Robert E. Bagwill
*Attorney, Agent, or Firm*—Omri M. Behr

[57] ABSTRACT

It has been found that the insertion of a copper object through the bark of the flowering tree prior to the setting of the fruiting wood of said tree will cause substantial enhancement of the flowering of said tree with consequent increase of fruit where produced, while limiting the growth of the foliage.

This effect is reversible in that removal of the copper object prior to the setting of the fruiting wood will return the tree to the normal ratio of flower and fruit to foliage.

5 Claims, No Drawings

ENHANCEMENT OF FLOWERING BY FLOWERING TREES

BACKGROUND OF THE INVENTION

The influence of trace elements such as copper upon the metabolism of plants, in particular that of trees, has long been recognized but is by no means fully understood. It is well known that certain of these trace elements are essential for the normal growth of plants. A U.S. Pat. to Laing, No. 3,074,207, which is directed to a nail device comprising a coating of certain trace element salts including copper, is of special interest. The patent contains a broad summary of the then known literature on the influence of trace metal salts. It should be noted that Laing is concerned with the maintenance of normal growth in trees. An Italian Patent No. 422,275 to Biamino discusses the therapeutic effect of a bi-metallic penetrating object such as a nail upon vegetables, this bi-metallic nail always having copper as one of the components. While Biamino speaks of the desirability of the presence of copper, he does not apply his device to trees, neither does he allege any utility other than a prophylactic effect. U.S. Pat. No. 831,678 to Osborne speaks of the strengthening of the growth of trees by driving a combination of wires of different composition, copper and iron being illustrated, into the trunk of a tree and constructing the ends of the wires in such a manner that they would conduct atmospheric electricity into the body of the tree. Osborne does not mention any particular timing for the insertion of the wires. Neither does she appear to recognize any effect upon the flowering of the tree as a result of this treatment. A similar but more controlled electrical treatment system is disclosed by Keller in U.S. Pat. No. 3,120,722. It should be noted that where a tree grows in a high fixed nitrogen area, foliage growth is encouraged while in a high potassium or high phosphorus location flowering is encouraged.

SUMMARY OF THE INVENTION

It has been found that inserting a copper object into the portion of a flowering tree through which the sap passes, that is to say into the actual cambium layer, at a time prior to the setting of the fruiting wood for the next growing season will inhibit the growth seasons. The enhancement of blossoms leads to the increase in fruit-bearing of the tree. The process is entirely reversible if the embedded copper object is removed prior to the aforesaid setting time of the fruiting wood the tree will revert to its normal bloom/foliage relationship.

DESCRIPTION OF THE PREFERRED EMBODIMENTS

It has been found that the bloom and fruit/foliage relationship of a flowering or flowering and fruiting tree may be radically changed in favor of an increase in bloom and fruit by insertion of metallic copper into the tree. The amount of copper required does not generally appear to be critical. However, as stated heretofore abnormally high nitrogen encourages foliage growth over flowering. One test experiment involved an apple tree which is located in an area of fertility, i.e. high nitrogen run off. The observed increase in flowing was negligible. It is presumed that the high nitrogen concentration effect blanketed the copper effect.

The effect has been noted as being caused by a copper wire by metallic copper pieces or a copper nail penetrating into the cambium layer.

Since any wound in the cambium is a potential source of infection, it is desirable to use a sterile copper object and to sterilize the bark area before insert. Any suitable sterilizing agent such as alkanol may be used. It is also desirable, though not critical, to seal the wound around the copper insert with a suitable wound sealing agent. The commercially available pitch-based sealants are suitable for this purpose.

The placement of the copper object is not critical. It does not matter whether it is placed in the main trunk or in a branch. The timing of the placement is, however, important. In the normal cycle of flowering and fruiting of a tree, foliage buds appear in the early spring and are followed shortly thereafter by the appearance of blossoms which flower briefly. After the flowering of the blossoms the plant begins to develop, reaching maturity between midsummer and late fall depending upon the nature of the fruit. At a certain time, particular to each species, between the time of flowering and the maturity of the fruit, the buds which will provide the blossoms during the coming season are set. These buda are referred to as the fruiting wood and the procedure is called the setting of the fruiting wood.

It has been found that in order to enhance the number of blooms for the subsequent year and decrease the number of buds giving rise to foliage, the copper object must be inserted at a time prior to the setting of the fruiting wood. Since it is somewhat difficult for one who is not a trained horticulturist to recognize the time of setting of the fruiting wood, it would be desirable to insert the copper object at any time between the time of maturity of the fruit two seasons prior to the desired enhanced season to a time just subsequent to the falling of the blossoms in the season immediately prior to that in which enhancement is desired. Similarly, where it is desired to reverse the process the copper object should be withdrawn at similar times.

The method of the present invention can be utilized not only to enhance the flowering and fruit bearing of mature trees but it may also be employed to bring young fruit trees to bearing earlier than would normally be the case.

If it is desired to permit a tree to rest for one or more seasons, the enhancement caused as set forth here in the past can be readily reversed by removing the copper object before the fruiting wood has set and therefore in the following season the tree will have its normal bloom to foliage ratio.

EXAMPLE I

A copper wire 0.75 mm × 10 cm was cut through the bark into the cambium of a crab apple tree. The foliage growth was negligible while the tree which normally blossomed very modestly was covered with blossoms in the subsequent season and loaded with crab apples.

Upon removal of the wire before setting of the fruiting wood, the subsequent season's flowering and fruiting were about 5% of that observed in the season subsequent to copper insertion.

EXAMPLE II

A peach tree which bore only one peach in a first season and no peaches in the next was treated by inserting three pieces of copper approximately one centimeter long by 0.075 centimeters thick axially through the bark thereof to a depth of ca 5 millimeters. In the following season the tree produced about 5" of new foliage wood growth in contrast to a normal ca 20" growth and ¾ bushel i.e. about 40-50 peaches.

In accordance with the above procedure apple trees, plum trees and cherry trees are caused to increase the fruiting yield.

In accordance with the above procedure in place of using broken pieces of copper there may be employed copper nails.

I claim:

1. A process for enhancing the flowering of flowering trees and reducing the foliage growth thereof during a predetermined flowering season which comprises penetrating the cambium of said trees with a metallic copper object at a point in time subsequent to the flowering thereof in the season previous to said predetermined season but prior to the setting of the fruiting wood during said previous flowering season and leaving said copper object in place until at least after said setting time.

2. A process of claim 1 wherein the copper object is sterile.

3. A process of claim 1 wherein the bark of the tree proximate to the intended point of penetration is sterilized and subsequently sealed with a tree wound sealant composition.

4. A process according to claim 1 wherein the flowering trees are fruit bearing trees, whereby the fruit yield is increased.

5. A process of permitting a flowering tree whose flowering capacity has been enhanced by penetrating the cambium of said tree with a metallic copper object prior to the setting of the fruiting wood during a first flowering season previous to the next subsequent season to revert to regular flower/foliage relationship which comprises removing the said copper object prior to the setting of the fruiting wood for the flowering season for which such reversion is desired.

* * * * *